Sept. 18, 1945.　　　W. G. SWIFT　　　2,385,312
SMOKING PIPE
Filed Sept. 6, 1944
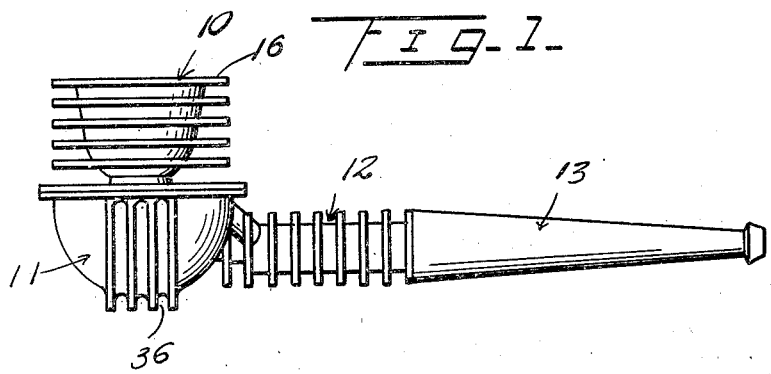
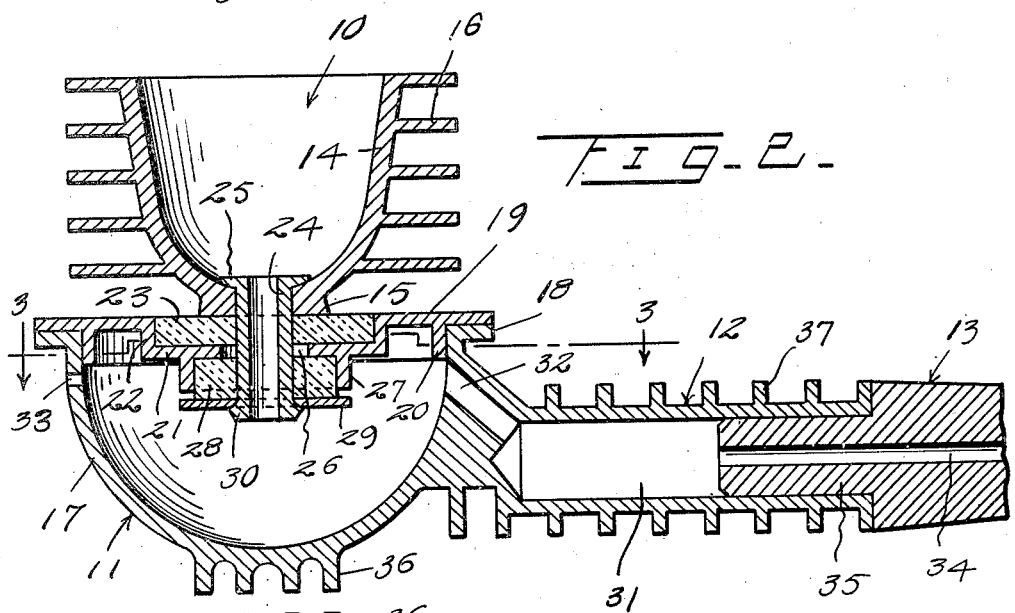
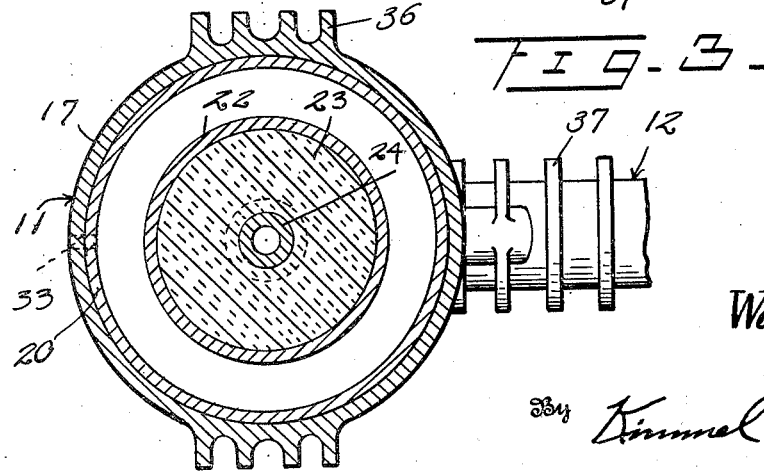
Inventor
Walter G. Swift
By Kimmel & Crowell
Attorneys Patented Sept. 18, 1945

2,385,312

UNITED STATES PATENT OFFICE 2,385,312

SMOKING PIPE

Walter G. Swift, Detroit, Mich.

Application September 6, 1944, Serial No. 552,894

1 Claim. (Cl. 131—194)

This invention relates to smoking pipes.

An object of this invention is to provide an improved pipe which may have the bowl and stem thereof made out of metal or other suitable material, the bowl and stem being formed with heat dissipating fins to maintain such parts cool.

Another object of this invention is to provide in a pipe of this kind, a liquid reservoir below the bowl, the reservoir having an upper outlet opening so that any liquid in the reservoir will not be drawn into the stem.

A further object of this invention is to provide in a pipe of this kind a bowl formed with a wide base having the latter heat insulated from the bowl, and the base formed with an annular flange frictionally engaging in the reservoir so that the latter may be readily opened for cleaning or the like.

A further object of this invention is to provide in a pipe of this kind an air intake opening in the reservoir for admitting cool air which will be drawn through the stem with the smoke.

With the foregoing objects and others which may hereinafter appear, the invention consists of the novel construction, combination and arrangement of parts as will be more specifically referred to and illustrated in the accompanying drawing, wherein an embodiment of the invention is shown, but it must be understood that changes, modifications and variations may be resorted to which fall within the scope of the invention as claimed.

In the drawing:

Figure 1 is a detail side elevation of a smoking pipe constructed according to an embodiment of this invention, Figure 2 is a fragmentary longitudinal section taken through the pipe, and Figure 3 is a sectional view taken on the line 3—3 of Figure 2.

Referring to the drawing, the numeral 10 designates generally a bowl which is mounted on a reservoir 11. The reservoir 11 has connected therewith a hollow stem 12 with which a mouthpiece 13 is connected. The bowl 10 comprises an upwardly flared cup-shaped body 14 which has the small end thereof lowermost and is formed with a base 15. A plurality of vertically spaced apart annular heat dissipating fins 16 are carried by the body 14 so as to dissipate the heat generated within the bowl 10.

The reservoir 11 comprises a substantially semiglobular body 17 which is formed with an upper annular flange 18. A plate 19 engages on the upper side of the flange 18 and is formed with a depending annular flange 20 telescoping within the upper end of the reservoir 11. The flange 20 is frictionally held within the upper end of the reservoir 11 so that the bowl structure with which the plate 19 is connected may be removed from the reservoir 11 for emptying of the latter. The plate 19 inwardly from the outer edge thereof has a downwardly offset plate 21 connected with the plate 19 by an annular flange 22. The flange 22 and the plate 21 form a seat within which a heat insulating disk 23 is adapted to seat.

The base 15 of the bowl 10 rests on the heat insulating disc 23 and the bowl 10 is firmly secured to the plate 21 by means of a hollow securing member 24. The securing member 24 has an upset upper end 25 engaging within the bottom of the bowl 10 and the tubular member 24 extends through a central opening 26 formed in the plate 21 with the opening 26 substantially larger than the outer diameter of the tubular member 24 so that the plate 21 will not contact at any time with the tubular member 24.

The plate 21 has extending from the lower side thereof a cylindrical flange 27, and a second heat insulating disc 28 is seated within the flange 27 and is preferably of a thickness greater than the depth of the flange 27 so that a portion of the disc 28 will project therebelow. A washer 29 is interposed between the upset lower end 30 of the tubular member 24 and the lower side of the heat insulating disc 28.

The lower end of the tubular member 24 extends a substantial distance downwardly into the reservoir 11 and the latter is in communication with the bore 31 of the stem 12 by means of a downwardly and rearwardly inclined passage 32. The passage 32 terminates at its upper forward end adjacent the lower edge of the flange 20 and is positioned above the lower end of the tubular member 24. In this manner any liquids within the reservoir or collector 11 will not normally be drawn into the stem 12. An intake vent 33 is provided in the reservoir or collector 11 diametrically opposite the outlet passage 32 so that a small amount of air for cooling of the gas or smoke will be permitted to enter the collector 11.

The mouthpiece 13 is formed with a central bore 34 and the forward end of the mouthpiece 13 is reduced as at 35 and telescopes interiorly of the rear end of the stem 12. The bottom of the collector or reservoir 11 is formed with a plurality of heat dissipating fins 36 and the stem 12 is also formed with a plurality of annular heat dissipating fins 37. With a construction as hereinbefore described, the bowl and stem may be made out of metal or other suitable material and by having the heat dissipating fins on the bowl, reservoir and stem, the assembly will be maintained in relatively cooled condition.

In the use of this smoking pipe, the tobacco is placed in the bowl 10 and lighted in the usual manner. As smoke is drawn downwardly by suction on the mouthpiece 13, the smoke will enter the collector 11 and any moisture from the bowl 10 will remain in the collector 11. The smoke with a small quantity of cool air entering the collector 11 through the opening 33 will pass rearwardly through the downwardly and rearwardly inclined passage 32 and then enter the bore 31 of the stem 12. Inasmuch as the bore 31 is larger in diameter than the bore 34 a second reservoir or collector will be formed within the stem 12 forwardly of the stud 35.

The collector 11 may be cleaned or emptied by lifting the bowl 10 from the collector, the plate 19 being removed with the bowl 10. If the bowl 10 becomes heated during the smoking of the tobacco therein, the heat will be dissipated by the annular fins 16 and any heat which is communicated to the collector 11 will be dissipated by the heat dissipating fins 36. In like manner heat communicated to the stem 12 will be dissipated by the annular heat dissipating fins 37.

What I claim is:

A smoking pipe comprising a bowl, a circular plate below said bowl, a downwardly offset socket formed in said plate, a heat insulating washer in said socket, an annular flange depending from said socket, a second heat insulating washer engaging within said flange and having a thickness greater than the depth of said flange, a second circular plate bearing against the lower side of said second washer, a tubular securing member securing said bowl, said plates and washers together, a liquid reservoir, an annular depending flange carried by said first plate and frictionally engaging in said reservoir, and a stem extending from said reservoir.

WALTER G. SWIFT.